(12) United States Patent
Sakai

(10) Patent No.: US 8,984,413 B2
(45) Date of Patent: Mar. 17, 2015

(54) TRANSMISSION SYSTEM, TRANSMISSION APPARATUS, AND METHOD

(75) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/834,685

(22) Filed: Jul. 12, 2010

(65) Prior Publication Data

US 2011/0016400 A1    Jan. 20, 2011

(30) Foreign Application Priority Data

Jul. 14, 2009 (JP) .................................. 2009-165902

(51) Int. Cl.
*G06F 17/00* (2006.01)
*G06F 9/445* (2006.01)

(52) U.S. Cl.
CPC .............. *G06F 8/65* (2013.01); *G06F 9/44536* (2013.01)
USPC ........... 715/744; 715/229; 715/733; 715/748; 715/705; 715/708; 709/217

(58) Field of Classification Search
None
See application file for complete search history.

(56) References Cited

U.S. PATENT DOCUMENTS

| 8,019,794 | B2 * | 9/2011 | Pathak et al. ................. 707/803 |
| 2001/0042045 | A1 * | 11/2001 | Howard et al. ................. 705/51 |
| 2004/0205590 | A1 * | 10/2004 | Smith et al. ................... 715/513 |
| 2005/0027807 | A1 * | 2/2005 | Fengler et al. ............... 709/206 |

FOREIGN PATENT DOCUMENTS

| JP | 2006-129362 A | 5/2006 |
| JP | 2008-15794 A | 1/2008 |

* cited by examiner

*Primary Examiner* — Stephen Hong
*Assistant Examiner* — Keith Bloomquist
(74) *Attorney, Agent, or Firm* — Canon USA, Inc. IP Division

(57) ABSTRACT

If a firmware set is released, a transmission system does not permit a change in a version combination of firmware included in the firmware set and does not display a change button on a firmware selection screen used for selecting a firmware set not to be changed/deleted. If a firmware set is not yet released, the transmission system permits a change in a version combination of firmware included in the firmware set. As for a firmware set whose change is permitted, the transmission system displays a change button on a firmware selection screen used for selecting a firmware set to be changed/deleted. As for a firmware set whose change is not permitted, the transmission system does not display the change button on the firmware selection screen used for selecting a firmware set to be changed/deleted.

14 Claims, 21 Drawing Sheets

FIG.6

MAIN MENU

· FIRMWARE REGISTRATION — 601
· FIRMWARE CHANGE/DELETE — 602
· FIRMWARE RELEASE — 603
· FIRMWARE RELEASE STOP — 604
· FIRMWARE DOWNLOAD — 605

FIG.7A

FIRMWARE TYPE SELECTION

701 → ● FIRMWARE FOR REMOTE UPDATABLE MODEL
○ FIRMWARE FOR REMOTE NON-UPDATABLE MODEL

702 — CANCEL    NEXT — 703

FIG.7B

FIRMWARE INFORMATION REGISTRATION

FIRMWARE SET NAME    [        ] — 711
FIRMWARE SET VERSION [        ] — 712

VERSION MANAGEMENT FILE
713 — [                    BROWSE] — 714

716 — BACK    REGISTER — 715

FIG.7C

FIRMWARE UPLOAD

FIRMWARE SET NAME    SERIES ABC1234
FIRMWARE SET VERSION  1.1

REMOTE UPDATE VERSION — 721
☐ 1.01  ☐ 1.02  ☐ 1.05

FIRMWARE DATA
  BODY       722 — [        BROWSE]
  ACCESSORY  723 — [        BROWSE]
  OTHERS     724 — [        BROWSE]

726 — BACK    UPLOAD — 725

FIG.8A

FIRMWARE INFORMATION REGISTRATION

FIRMWARE SET NAME  [_____]~731
FIRMWARE SET VERSION  [_____]~732

734~[ BACK ]  [ REGISTER ]~733

FIG.8B

FIRMWARE UPLOAD

FIRMWARE SET NAME   SERIES LMN7890
FIRMWARE SET VERSION   1.5
FIRMWARE
  BODY   741~[_____|BROWSE]

744~[ BACK ]  [ UPLOAD ]~742

FIG.9

| ATTRIBUTE | VALUE |
|---|---|
| FIRMWARE TYPE | FOR REMOTE UPDATABLE MODEL |
| FIRMWARE SET NAME | SERIES ABC1234 |
| FIRMWARE SET VERSION | 1.10 |
| VERSION MANAGEMENT FILE PATH | /ABCD1234/1.10/vermng.csv |
| DATE OF REGISTRATION | 20XX.12.12  11:22:33 |
| DATE LAST MODIFIED | 20XX.12.22  17:18:19 |
| REMOTE UPDATE VERSION | 1.01, 1.02 |
| RELEASE STATUS | ALREADY RELEASED |
| FIRMWARE DATA PATH | /ABCD1234/1.10/data/1.dat |
|  | /ABCD1234/1.10/data/2.dat |
|  | /ABCD1234/1.10/data/3.dat |

FIG.10A

SELECT FIRMWARE
ENTER SEARCH CONDITION

FIRMWARE TYPE   ● ALL
SELECTION       ○ FIRMWARE FOR REMOTE UPDATABLE MODEL
1001            ○ FIRMWARE FOR REMOTE NON-UPDATABLE MODEL
                ○ OTHERS

FIRMWARE SET NAME    [                    ] ~1002
FIRMWARE SET VERSION [                    ] ~1003

STATUS          ■ REGISTERED
                □ ALREADY RELEASED
1004            □ TO BE RELEASED

1006 ~[CANCEL]    [SEARCH]~ 1005

FIG.10B

SELECT FIRMWARE
SEARCH RESULT    ~1011

| FIRMWARE TYPE | VERSION | BASIC SET STATUS | ADDITIONAL SET STATUS | |
|---|---|---|---|---|
| REMOTE UPDATABLE | 1.1 | RELEASED | RELEASED | [SELECT] ~1012a |
| REMOTE UPDATABLE | 1.2 | RELEASED | REGISTERED | [SELECT] ~1012b |
| REMOTE NON-UPDATABLE | 2.1 | REGISTERED | — | [SELECT] ~1012c |

[BACK]~1013

FIG.10C

SET SALES COMPANY
FIRMWARE SET NAME      SERIES ABC1234
FIRMWARE SET VERSION   1.2
ADDITIONAL SET NAME    "SET A" FOR COUNTRY "A"

BASIC SET
       ○ RELEASE NOW
1021 ~ ● DESIGNATE RELEASE DATE AND TIME
1022 ~ [2009 ▽][November ▽][22 ▽][23 hours ▽][00 min ▽]

ADDITIONAL SET
       ○ RELEASE NOW
1025 ~ ● DESIGNATE RELEASE DATE AND TIME
1026 ~ [2009 ▽][November ▽][22 ▽][23 hours ▽][00 min ▽]

1024 ~[BACK]    [RELEASE]~1023

FIG.11A

SELECT FIRMWARE SEARCH RESULT ~1101  1103a

| FIRMWARE SET NAME | VERSION | BASIC SET STATUS | ADDITIONAL SET STATUS | |
|---|---|---|---|---|
| SERIES ABC1234 | 1.1 | ALREADY RELEASED | ALREADY RELEASED | DELETE |
| SERIES ABC1234 | 1.2 | ALREADY RELEASED | REGISTERED | DELETE  UPDATE |
| SERIES LMN7890 | 2.1 | REGISTERED | — | CHANGE  DELETE |

1103b
1104
1103c
1102
1105 — BACK

FIG.11B

FIRMWARE CHANGE

FIRMWARE SET NAME    [SERIES ABC1234]  ~1111
FIRMWARE SET VERSION [1.2]             ~1112

VERSION MANAGEMENT FILE
○ CHANGE  ● DO NOT CHANGE
1113
[_____ BROWSE ] ~1114

1116 — BACK    REGISTER ~1115

FIG.11C

CHANGE ADDITIONAL SET

FIRMWARE SET NAME    [SERIES ABC1234]        ~1121
FIRMWARE SET VERSION [1.2]                   ~1122
ADDITIONAL SET NAME  ["SET A" FOR COUNTRY "A"] ~1123

ADDITIONAL SET
○ CHANGE  ● DO NOT CHANGE
1124
[_____ BROWSE ] ~1125

1127 — BACK    REGISTER ~1126

FIG.12A

SELECT FIRMWARE
ENTER SEARCH CONDITION (PARTIAL MATCH)
FIRMWARE SET NAME [_____] ~1201
FIRMWARE SET VERSION [_____] ~1202

1203~[CANCEL]  [SEARCH]~1204

FIG.12B

SELECT FIRMWARE
SEARCH RESULT  ~1211

| NAME | VERSION | |
|---|---|---|
| SERIES ABC1234 | 1.1 | [SELECT] ~1212a |
| SERIES ABC1234 | 1.2 | [SELECT] ~1212b |
| SERIES ZYX9876 | 2.1 | [SELECT] ~1212c |

[BACK] ~1213

FIG.12C

DOWNLOAD FIRMWARE

FIRMWARE SET NAME    SERIES ABC1234
FIRMWARE SET VERSION  1.1

SELECT FIRMWARE TO DOWNLOAD

■ MAINCNT
■ PRNCNT
1221~ □ SCNCNT
□ COPY.BIN

1223~[SELECT ALL]  [CANCEL ALL]~1224

1225~[BACK]  [DOWNLOAD]~1222

TRANSMISSION SYSTEM, TRANSMISSION APPARATUS, AND METHOD

BACKGROUND OF THE INVENTION

1. Field of the Invention

The present invention relates to a technique useful for transmitting a program to a device on a network.

2. Description of the Related Art

Conventionally, there is known a technique useful for downloading firmware of an image forming apparatus from a server, which transmits firmware, via a network and updating the firmware. Such a technique is discussed in Japanese Patent Application Laid-Open No. 2006-129362. Further, there is also a technique, which is discussed in Japanese Patent Application Laid-Open No. 2008-15794, where a server selects an appropriate combination of firmware according to configuration information of an image forming apparatus or version information of the firmware, and transmits the firmware to the image forming apparatus.

In recent years, the scale of firmware of image forming apparatuses is very large, and the firmware is updated more frequently. Thus, the combination of firmware also needs to be updated more frequently. For this reason, user interfaces (UI) useful in easily changing a combination of firmware have been developed. Further, recent servers that transmit firmware are equipped with firmware managing functions such as release date scheduling of new firmware.

However, according to the conventional firmware updating, the firmware combination in a firmware set already released to the market may be changed due to an error of an operator. If such an error occurs, firmware sets of the same version number but with different contents may be distributed. Then, users may be confused and the provider of the firmware will have difficulty in providing backup service.

SUMMARY OF THE INVENTION

The present invention is directed to a transmission system which is capable of preventing distribution of program sets, which are supposed to include a same combination of programs but actually include a different combination of programs, in the market.

According to an aspect of the present invention, a system includes a transmission apparatus configured to control transmission of a program set including a plurality of programs and an information processing apparatus. The information processing apparatus includes a display device, a setting unit configured to perform setting of release of the program set, and a display unit configured to display a screen used for editing the program set on the display device. The transmission apparatus includes a decision unit configured to decide that, as for a program set whose release is set, a change regarding the program set is to be permitted, and as for a program set whose release is not set, a change regarding the program set is not to be permitted, and a provision unit configured to provide, if the change regarding the program set is not to be permitted, a screen whose change regarding the program set is disabled to the information processing apparatus as a screen displayed by the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a main menu screen.

FIGS. 7A to 7C illustrate a first example of a UI displayed when firmware is registered.

FIGS. 8A and 8B illustrate a second example of a UI displayed when firmware is registered.

FIG. 9 illustrates a management attribute of a firmware set.

FIGS. 10A to 10C illustrate a UI used for releasing firmware.

FIGS. 11A to 11C illustrate a UI used for changing and deleting a firmware set, and replacing an additional set.

FIGS. 12A to 12C illustrate a UI for downloading a firmware set/additional set.

DESCRIPTION OF THE EMBODIMENTS

Various exemplary embodiments, features, and aspects of the invention will be described in detail below with reference to the drawings.

Figure 1:
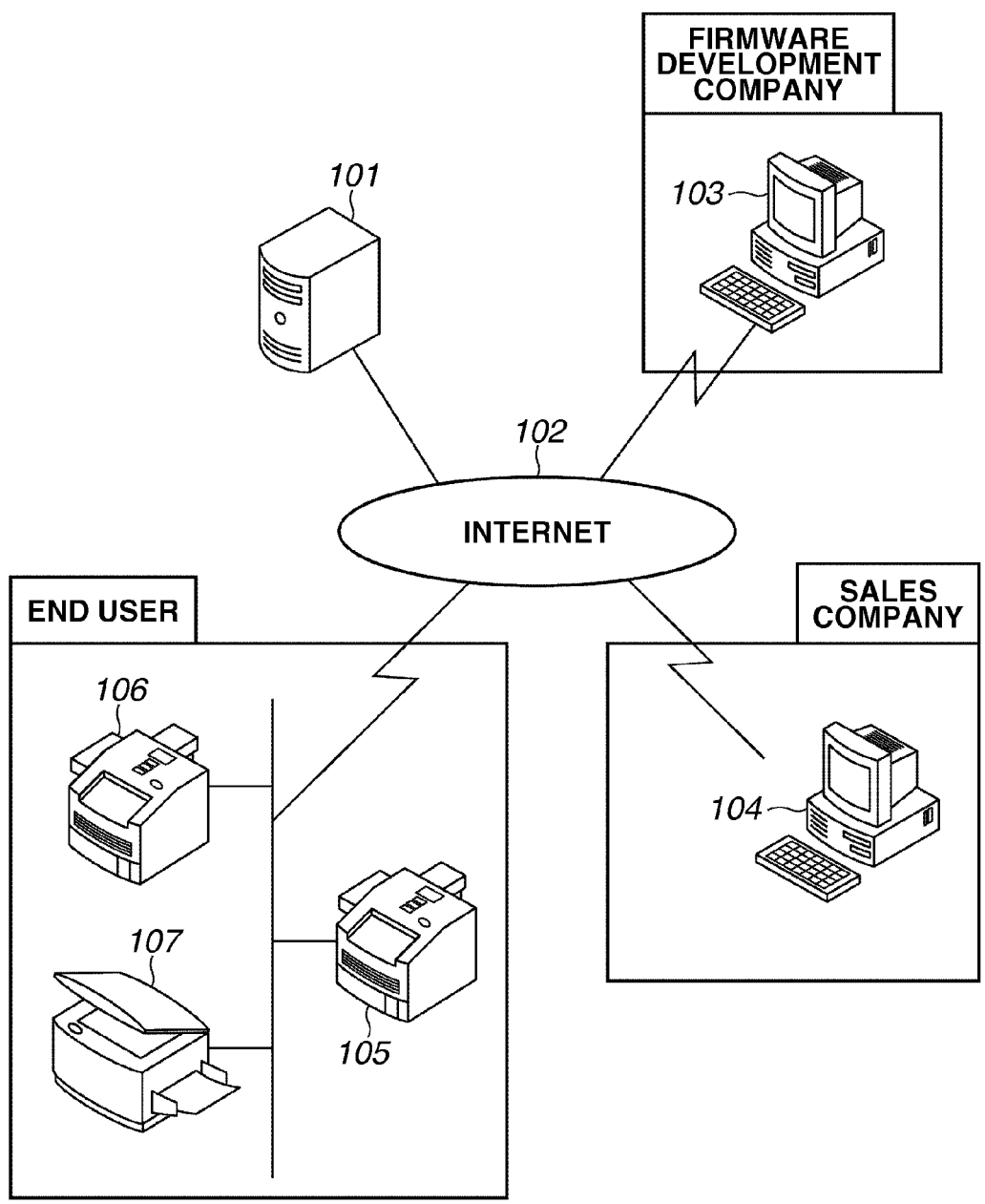
FIG. 1 illustrates a system configuration of a firmware version update system.

FIG. 1 illustrates an example of a system configuration of a firmware version update system (transmission system) according to an exemplary embodiment of the present invention. The firmware version update system includes a firmware transmission server 101, a computer 103 of a firmware development company, a computer 104 of a sales company, and image forming apparatuses 105, 106, and 107. Each of these apparatuses is connected via the Internet 102. The number of the apparatuses is not limited to what is illustrated in FIG. 1.

The sales company is a regional sales company that sells image forming apparatuses in its country or region and also provides maintenance and management service of the apparatuses. The firmware transmission server 101 releases and transmits a firmware set including a plurality of pieces of firmware to the computer 104 of the sales company. Some of the firmware in the firmware set is designed for a specific language or the distribution is limited to the regions where the sales company is in charge of. The sales company is established in each country. However, all countries do not have the firmware in their language.

Thus, according to the present embodiment, together with a firmware set, the firmware transmission server 101 also releases and transmits an additional set to the sales companies of such countries (or regions). The additional set is a software module being a language resource that corresponds to the language of the country. The image forming apparatuses 105 to 107 for end users receive supply of the firmware set from the computer 104 of the sales company. At that time, if an additional set is set to the firmware, the image forming apparatuses 105 to 107 receive the additional set together with the firmware set. In the following description, a "firmware set/additional set" includes the following meaning. In other words, if an additional set is not set to the firmware, it means the firmware set itself. If an additional set is set to the firmware, it means the firmware set and the additional set.

Further, the image forming apparatuses 105 to 107 can directly download the firmware set/additional set from the firmware transmission server 101. According to a request from the computer 104 of the sales company or the image forming apparatuses 105 to 107, the firmware transmission server 101 transmits the firmware set itself or the additional set itself as well as information of the firmware set/additional set. Each of the firmware set/additional set stored on the firmware transmission server 101 is given a release status. Whether the firmware set/additional set is to be released or not to be released is managed according to the release status. According to the present embodiment, the sales company or the end user can only acquire a firmware/additional set whose release status is "already released". Details of the release status will be described below.

The computer 103 of the firmware development company manages the firmware/additional set on the firmware transmission server 101. In other words, with respect to the firmware transmission server 101, the computer 103 of the firmware development company performs various setting operations including registration and deletion of the firmware set/additional set to be transmitted, update of information associated with the firmware set/additional set, release/non-release of the firmware/additional set to the sales company or the end user.

In the description below, information associated with a firmware set is referred to as "firmware information" as needed, and the firmware set itself is referred to as "firmware data" as needed. Further, information associated with an additional set is referred to as "additional information" as needed, and the additional set itself is referred to as "additional data" as needed. Furthermore, in the following description, "firmware data/additional data" and "firmware information/additional information" means only the firmware data (information) if an additional set is not set to the firmware, and means the firmware data (information) and the additional data (information) if an additional set is set to the firmware.

The computer 104 of the sales company can download the firmware set/additional set released by the firmware transmission server 101. If an image forming apparatus of a customer is not connected to the network and remote update is not possible, the firmware set/additional set is downloaded to the computer 104 of the sales company and the firmware/additional set is stored in a storage medium. Then, a person in charge of the customer in the sales company visits the customer and delivers the medium. At the customer's site, the person in charge performs the operations necessary in updating the firmware/additional set of the image forming apparatus.

The image forming apparatuses 105 to 107 include copy and print functions. A plurality of firmware/additional sets used for controlling a scanner or a printer are installed in the image forming apparatuses 105 to 107. The image forming apparatuses 105 to 107 acquire firmware directly from the firmware transmission server 101 or via the computer 104 of the sales company and update it. Further, the image forming apparatuses 105 to 107 can readout the firmware set/additional set stored in the storage medium and update it.

According to the present embodiment, an example of a transmission apparatus is realized by the firmware transmission server 101, and an example of an information processing apparatus is realized by the computer 104 of the sales company.

Figure 2:
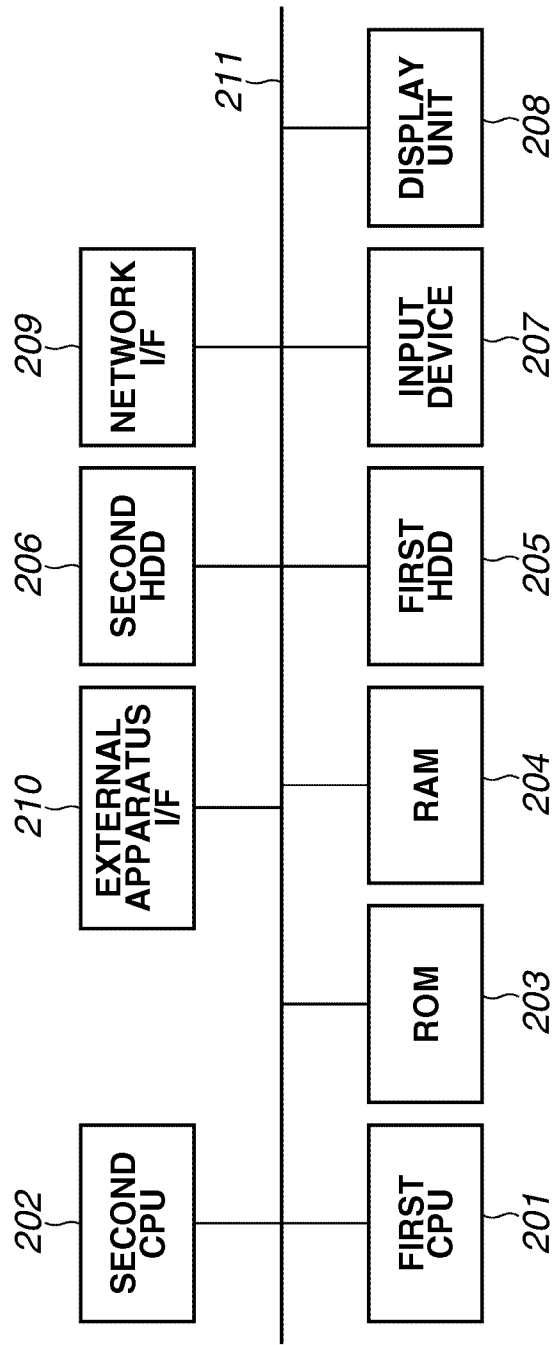
FIG. 2 illustrates a hardware configuration of a firmware transmission server.

FIG. 2 illustrates an example of a hardware configuration of the firmware transmission server 101. The hardware configurations of the computers 103 and 104 are similar to the configuration illustrated in FIG. 2. A first central processing unit (CPU) 201 and a second CPU 202 perform the processing of the server (apparatus). A read-only memory (ROM) 203 stores programs or data associated with the processing of the apparatus. A random access memory (RAM) 204 stores temporary data associated with the processing of the apparatus. A first hard disk drive (HDD) 205 and a second HDD 206 store programs and data associated with the processing of the apparatus, temporary data, firmware data and firmware information, as well as additional data and additional information.

An input device 207 is, for example, a keyboard or a pointing device used for accepting instructions. A display unit 208 displays the operating state of the apparatus and also information output from each computer-executable program running on the apparatus. A network I/F 209 is connected to a local area network (LAN) or the Internet 102 via a network so that information can be externally exchanged. An external device I/F 210 is connected to an external storage apparatus or the like. The above-described components are mutually connected via a system bus 211 and data is exchanged between the components.

Figure 3:
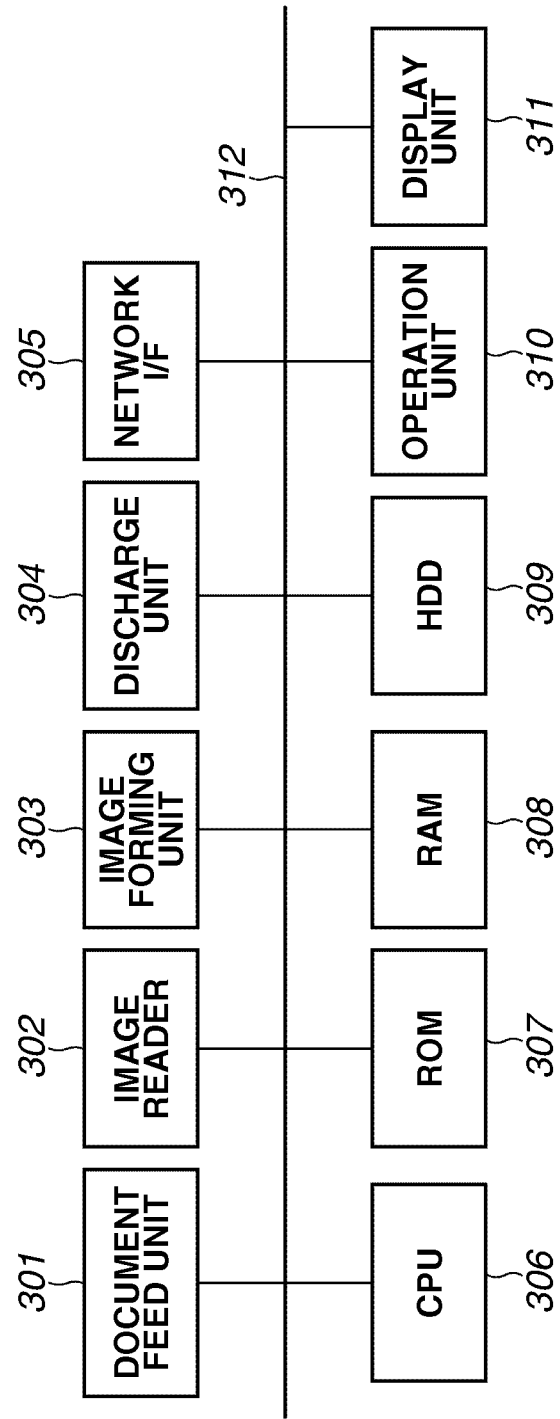
FIG. 3 illustrates a hardware configuration of an image forming apparatus.

FIG. 3 illustrates an example of a hardware configuration of the image forming apparatuses 105 to 107. A multifunction peripheral, which integrally includes functions of a printer and a fax machine, a printer, which receives data from a personal computer (PC) and prints the received data, a scanner, or a facsimile machine can be used as the image forming apparatus. In FIG. 3, a configuration of a multifunction peripheral is illustrated as an example of the image forming apparatus.

An image reader 302 reads information of a document transmitted from a document feed unit 301. An image forming unit 303 converts information of the document read by the image reader 302 as well as data received via the network into a print image. The image is printed on a sheet or the like. A discharge unit 304 discharges the printed sheet while performing processing such as sorting and stapling. A network I/F 305 is connected to a LAN or the Internet 102 via a network so that information can be exchanged with an external apparatus.

Figure 4:
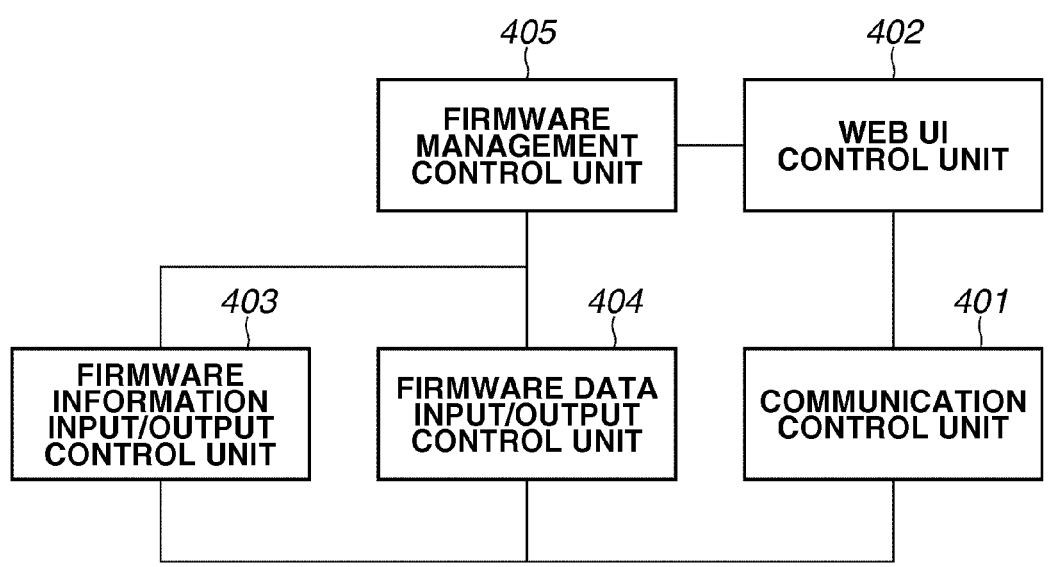
FIG. 4 illustrates a configuration of software modules of the image forming apparatus.

A CPU 306 executes various programs and control processing regarding copying, scanning, and printing. A ROM 307, which is a non-volatile storage medium, stores programs and data associated with the processing of the apparatus. A RAM 308 electrically and rewritably stores temporary data associated with the processing of the apparatus. An HDD 309 stores programs and data associated with the processing of the apparatus, temporary data, and user data that has been transmitted. An operation unit 310 accepts instructions input to the apparatus. A display unit 311 displays information associated with the operation state of the apparatus as well as the operation performed with respect to the operation unit 310. The above-described components are connected via a system bus 312 and data is exchanged between the components FIG. 4 illustrates an example of a configuration of software modules of the image forming apparatuses 105 to 107, which is associated with the transmission of the firmware set/additional set with respect to the firmware transmission server 101 and the management of the firmware set/additional set.

A communication control unit 401 is a module for controlling communication with an external apparatus via the Internet 102. A web UI control unit 402 is a module for controlling a firmware management UI, which is operated by an external apparatus. A firmware information input/output control unit 403 manages input/output of the firmware information/additional information acquired from the web UI control unit 402. A firmware data input/output control unit 404 manages input/output of the firmware data/additional data acquired from the web UI control unit 402.

A firmware management control unit 405 controls each of the above-described control units 401 to 404. The firmware management control unit 405 links firmware data with firmware information, additional data with additional information, and firmware set with additional set, and further manages them. Additionally, the firmware management control unit 405 performs overall management regarding transmission of the firmware set/additional set.

Figure 5:
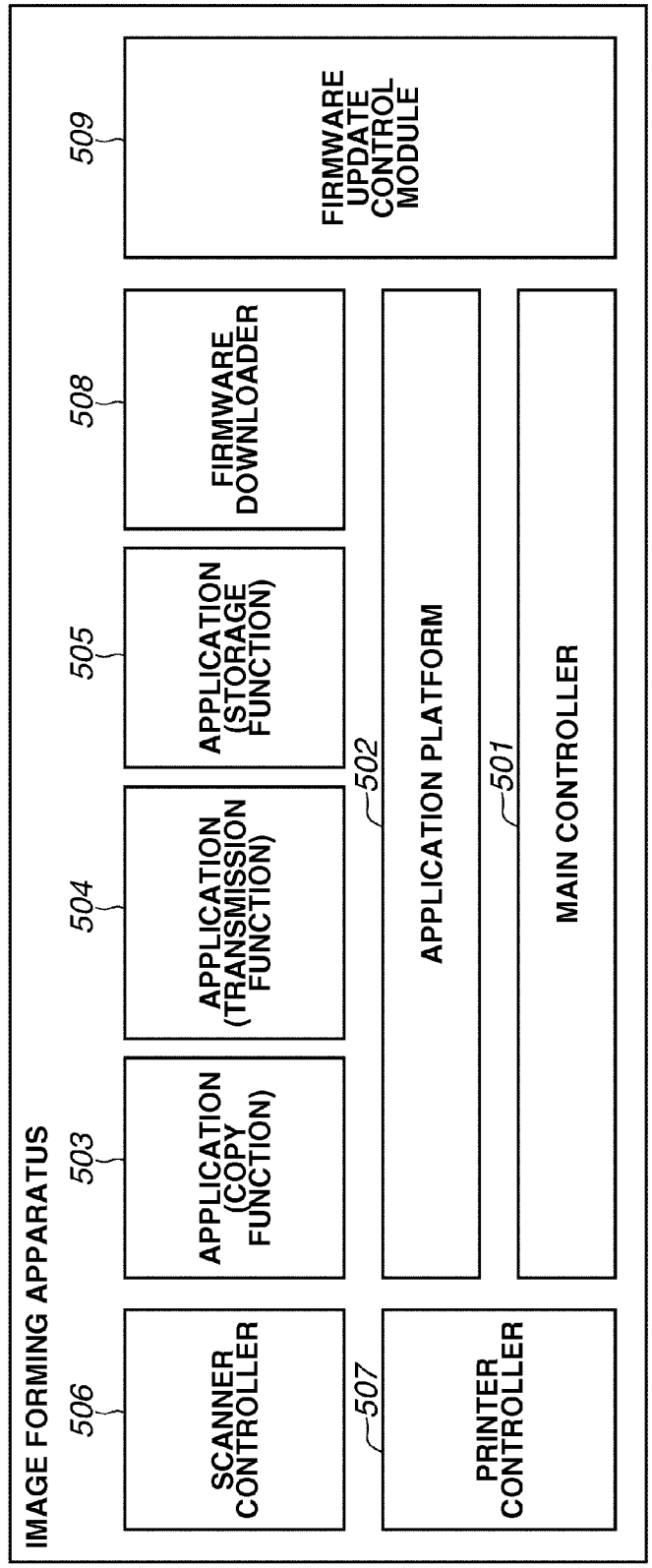
FIG. 5 illustrates a configuration of firmware of the image forming apparatus.

FIG. 5 illustrates an example of a configuration of firmware of the image forming apparatuses 105 to 107. A main controller 501 controls the entire image forming apparatus by controlling other controllers. An application platform 502 is used for running application programs 503 to 505. The application platform 502 runs on the main controller 501. The application programs 503 to 505 are firmware that operates on the application platform 502, and realize the main functions of the image forming apparatuses 105 to 107 such as copying, transmitting, and storing. A scanner controller 506 is used for controlling the scanner. A printer controller 507 is used for controlling the printer. A firmware downloader 508 is used for downloading various types of firmware from the firmware transmission server 101. A firmware update control module 509 is used for applying various types of firmware downloaded by the firmware downloader 508 to the image forming apparatuses 105 to 107 and updating the firmware.

Although a plurality of pieces of firmware are necessary in the operation of the image forming apparatuses 105 to 107, a combination of the firmware pieces which is necessary in making the image forming apparatuses 105 to 107 operate normally is limited. Thus, the firmware transmission server 101 considers a set of a plurality of pieces of firmware as one unit, and a set of firmware necessary in operating the image forming apparatuses 105 to 107 is called a firmware set. According to the present embodiment, the firmware set is an example of the program set. Further, an additional set of the firmware set is an example of the additional program.

Next, an example of a UI used when the firmware is managed will be described. The firmware management is performed when the firmware transmission server 101 is accessed by a computer connected to the network via a web browser.

FIG. 6 illustrates an example of a main menu screen of a UI used for firmware management. The main menu screen is displayed first on the display unit 208 of the computer 103 of the firmware development company when the computer 104 of the sales company accesses the firmware transmission server 101 via a web browser and user authentication performed using a user authentication screen (not shown) is successful. On the main menu screen, there is provided a menu of links including a firmware registration 601, a firmware change/delete 602, a firmware release 603, a firmware release stop 604, and a firmware download 605. By selecting one of these links, the user can display a corresponding firmware management screen (UI). Further, according to the present embodiment, content of the main menu screen that is displayed depends on the authority of the user that gains access thereto. If a user who is not given the firmware management authority makes access, a main menu screen including only the firmware download 605 out of the links illustrated in FIG. 6 will be displayed.

FIGS. 7A to 7C and FIGS. 8A and 8B illustrate an example of a UI displayed on the display unit 208 of the computer 104 of the sales company when firmware is registered on the firmware transmission server 101.

FIG. 7A illustrates an example of a firmware type selection screen which is displayed when a user clicks the firmware registration 601 displayed on the main menu screen in FIG. 6. A radio button 701 is used for selecting a type of the firmware set to be registered. A cancel button 702 is used for canceling the registration processing of the firmware and returning to the main menu screen illustrated in FIG. 6. A next button 703 is used for proceeding to the next screen (screen illustrated in FIG. 7B).

FIG. 7B illustrates an example of a firmware information registration screen which is displayed when the user clicks the next button 703 while "firmware for remote updatable model" is selected by the radio button 701 in the firmware type selection screen. The firmware information registration screen is used for registering information of the firmware (firmware information) to be registered.

A text input area 711 is used for entering a name of the firmware set to be registered. A text input area 712 is used for entering a version of the firmware set to be registered. A file path selection area 713 is used for setting a path to a file which includes information used for managing a version of the firmware included in the firmware set (also called as version management file as needed).

If the user of the computer 104 of the sales company selects a browse button 714, the user can select a file using a file browser of the computer 104. If the user of the computer 104 of the sales company selects a file, then a path to the file is displayed in the file path selection area 713. A register button 715 is used for transmitting information and version management file entered in the firmware information registration screen illustrated in FIG. 7B to the firmware transmission server 101 and registering the firmware information on the firmware transmission server 101. A back button 716 is used for returning to the firmware type selection screen illustrated in FIG. 7A so that the firmware set type can be selected again.

If the user desires to register an additional set to the firmware set, in addition to the information illustrated in FIG. 7B, for example, a text input area used for entering the name of the additional set is displayed on the firmware information registration screen.

FIG. 7C illustrates an example of a firmware upload screen displayed when the user selects the register button 715 displayed on the firmware information registration screen illustrated in FIG. 7B. Check boxes 721 are used for selecting a firmware set version to be remotely updated. In other words, a remote update of a version of a firmware set selected by the check boxes 721 is permitted. The user can update the firmware of the version selected by the check boxes 721 by directly downloading the firmware data using the firmware downloader 508 included in the image forming apparatus. Older versions of the firmware set, which are not included in the items of the check boxes, cannot be directly updated to the firmware (version) to which the user desires to register (update) on the screen in FIG. 7C.

File path selection areas 722 to 724 are used for selecting a path to a file of the firmware to be registered. The item displayed here corresponds to the firmware that is included in the version management file transmitted via the firmware information registration screen illustrated in FIG. 7B. An upload button 725 is used for transmitting the selected file to the firmware transmission server 101 and uploading the file of the firmware to the firmware transmission server 101. A back button 726 is used for returning to the firmware information registration screen illustrated in FIG. 7B and entering the firmware information again.

If the user desires to register an additional set to the firmware set, in addition to the information illustrated in FIG. 7C, the following information, for example, is displayed on the firmware upload screen. In other words, a name of the additional set input in the firmware information registration screen, a file path selection area used for setting a path to the file of the additional set, and a browse button used for operating the file path selection area are displayed on the firmware upload screen.

FIG. 8A illustrates an example of a firmware information registration screen which is displayed if the user clicks the next button 703 while "firmware for remote non-updatable model" is selected in the firmware type selection screen illustrated in FIG. 7A. The firmware information registration screen includes a text input area 731 where a firmware set name is entered, a text input area 732 where a firmware set version is entered, a register button 733, and a back button 734. If the user clicks the register button 733, information in the text input areas 731 and 732 is transmitted to the firmware transmission server 101. If the user clicks the back button 734, the screen returns to the firmware type selection screen illustrated in FIG. 7A.

If the user desires to register an additional set to the firmware set, in addition to the information illustrated in FIG. 8A, a text input area to enter the name of the additional set, for example, is displayed on the firmware information registration screen.

FIG. 8B illustrates an example of a firmware upload screen which is displayed when the user clicks the register button 733 on the firmware information registration screen illustrated in FIG. 8A. A file path selection area 741 is a UI used for selecting a path of a file of the firmware to be registered. If the user clicks an upload button 742, the file designated by the file path selection area 741 is uploaded to the firmware transmission server 101.

If the user desires to register an additional set to the firmware set, in addition to the information in FIG. 8B, the following information is displayed on the firmware upload screen. The information is, for example, a name of the additional set entered in the firmware information registration screen, a file path selection area used for setting a file path of the additional set, and a browse button used for operating the file path selection.

According to the present embodiment, at least the firmware set or the additional set is set on the same screen (see FIGS. 7B, 7C, 8A, and 8B). However, the firmware set and the additional set can be individually set on different screens and then linked to each other.

Next, an example of a version management file designated by the file path selection area 713 and the browse button 714 on the firmware information registration screen illustrated in FIG. 7B will be described. The version management file includes, for example, the following items and values.

FormatVersion: 1.0
FirmGroupVersion: 1.1
PROG, MAINCNT.BIN, 01.10
PROG, PRNCNT.BIN, 01.05
PROG, SCNCNT.BIN, 01.01
LANG, LANGJA.DAT, 01.10
LANG, LANGEN.DAT, 01.10
APP, COPY.BIN, 01.01
APP, SEND.BIN, 01.02

As can be seen from the above items and values, the version management file includes a version that indicates the configuration of the version management file (first line), a version of the firmware set (second line), and firmware information of each piece of firmware (third to ninth lines). Each piece of firmware information is listed according to the type, the file name, and the version information of the firmware separated by a comma.

FIG. 9 illustrates an example of a management attribute of a registered firmware set managed by the firmware transmission server 101. The "firmware type" attribute indicates a type of the firmware set which has been registered, and either "firmware for a remote updatable model" or "firmware for remote non-updatable model" is selected. The "firmware set name" attribute indicates a name of the firmware set which has been registered. The "firmware set version" attribute indicates a version of the firmware set which has been registered. The "version management file path" attribute indicates a path to the version management file corresponding to the registered firmware set. The "date of registration" attribute indicates the date and time the firmware set has been registered. The "date last modified" attribute indicates the date and time the information has been last modified. The "remote update version" attribute indicates the versions that can be remotely updated.

The "release status" attribute indicates whether the registration content is released to the sales company and the end user. According to the present embodiment, the release status is any one of "registered", "to be released", "already released", and "release stopped". The "registered" state is a state directly after the registration of the firmware set and the sales company and the end user are unable to download the firmware set. If the release operation is performed with respect to a firmware set in the "registered" or the "release stopped" state, the state of the firmware set will be changed to the state "to be released" or "already released". If the release operation is performed while designating the release date and time, the state of the firmware set will be changed to "to be released". At the designated date and time, the state of the firmware set is changed to "already released". Then, the sales company and the end user can download the firmware. If the release stop operation is performed when the state of the firmware set is "already released", the state will be changed to the "release stopped" state. Then, the sales company and the end user will not be able to download the firmware set.

Although, description of the management attributes of the additional set is omitted, a release status of the additional set, which is one out of "registered", "to be released", "already released", and "release stopped", is included in the management attributes of the additional set as is with the firmware set.

FIGS. 10A to 10C illustrate an example of a UI displayed on the display unit 208 of the computer 104 of the sales company. The UI is displayed when the firmware stored on the firmware transmission server 101 is released to the sales company or the end user. If a great number of firmware sets are stored on the firmware transmission server 101, it is difficult to select a particular firmware set out of all the firmware sets. Thus, according to the UI configuration illustrated in FIG. 10A, first, the search condition is determined and next a list of the firmware sets that match the search condition is displayed. Then, the firmware set to be changed is selected from the list.

FIG. 10A illustrates an example a firmware search condition setting screen which is displayed when the user clicks the firmware release 603 on the main menu screen illustrated in FIG. 6. The user can select only one firmware type out of the displayed types using a radio button 1001. A text input area 1002 is where the name of the firmware set is entered. A text input area 1003 is where the version of the firmware set is entered. Check boxes 1004 are used for selecting the release status of the firmware set. The status which is selected according to the check boxes 1004 is not limited to one status. A search button 1005 is used for transmitting the entered search condition to the firmware transmission server 101 so that the search result is displayed. A cancel button 1006 is used for canceling the processing and returning to the main menu screen illustrated in FIG. 6.

FIG. 10B is a firmware selection screen displayed after the user clicks the search button 1005 on the firmware search condition setting screen in FIG. 10A. A list 1011 is displayed on the firmware selection screen. The list 1011 is a list of firmware sets that match the search condition entered in the firmware select condition setting screen illustrated in FIG. 10A. Regarding the list 1011, the "basic set status" is the release status of the firmware set and the "additional set status" is the release status of the additional set. The additional set status with "-" indicates that an additional set is not available. If a selection button 1012 of the list 1011 is clicked, a screen used for changing a setting state regarding release of a firmware set/additional set (screen illustrated in FIG. 10C) is displayed. A back button 1013 is used for returning the screen to the firmware search condition setting screen illustrated in FIG. 10A so that the search condition can be selected again.

FIG. 10C is a release date setting screen which is displayed when the user clicks the selection button 1012 on the firmware selection screen illustrated in FIG. 10B. It is also a screen used for setting a release date. A radio button 1021 is used for selecting whether the firmware set is to be released at once or at a later designated time. A combo box 1022 is usable when the "designate release date and time" is selected by the radio button 1021. Year, month, day, and time of when the firmware set is to be released can be designated by using the combo box 1022. A radio button 1025 is displayed when an additional set is set to the firmware set. The radio button 1025 is used for selecting whether the additional set is to be released at once or at a later designated time. A combo box 1026 is displayed if an additional set is set to the firmware set. The combo box 1026 can be set when the "designate release date and time" is selected by the radio button 1025. The combo box 1022 designates the year, month, day, and time of when the firmware set is to be released. If an additional set is not set to the firmware set, no additional set name is displayed on the release setting screen illustrated in FIG. 10C.

A release button 1023 is selected when the user changes the release status of the firmware set according to the designated content. For example, if the user selects "release now" of the radio button 1021, the release status of the firmware set is changed to "already released" and, from that time, the firmware can be downloaded from the sales company or transmitted to the image forming apparatuses 105 to 107. If the user selects "designate release date and time", the release status of the firmware set will be changed to "to be released". The firmware cannot be downloaded or transmitted at that point in time but when the designated time comes, the state will be changed to "already released" and the firmware set can be downloaded.

A back button 1024 is used for returning to the firmware selection screen illustrated in FIG. 10B and selecting a firmware set again. If the user selects the "firmware release stop" in the main menu screen illustrated in FIG. 6, a UI similar to the UI which is displayed when the "firmware release" is selected is displayed. For example, after UIs similar to those illustrated in FIGS. 10A and 10B are displayed, a UI similar to the one illustrated in FIG. 10C but having "release" replaced with "release stopped" will be displayed.

According to the present embodiment, at least either of the release/release stop of the firmware set and the release/release stop of the additional set corresponding to the firmware set is set on the same screen (see FIGS. 10B and 10C). However, the release/release stop of the firmware set and the release/release stop of the additional set corresponding to the firmware set can be individually set on different screens.

FIGS. 11A to 11C illustrate an example of a UI displayed on the display unit 208 of the computer 104 of the sales company. The UI is used for changing or deleting a firmware set stored on the firmware transmission server 101 or replacing (updating) an additional set corresponding to the firmware set. Since it is difficult to select a desired firmware set from all the registered firmware sets, an operation similar to that for the release operation of the firmware set is performed. In other words, first, the search condition is input, and then the desired firmware set is selected from the narrowed down list of the firmware sets. In the main menu screen illustrated in FIG. 6, if the user clicks the firmware change/delete 602, the search condition setting screen used for entering the search condition is displayed. Since the configuration of the search condition setting screen is similar to that of the firmware search condition setting screen illustrated in FIG. 10A, detailed description is omitted.

FIG. 11A illustrates an example of a firmware selection screen displayed after the user clicks the search button 1005 on the search condition setting screen. A list 1101 is displayed on the firmware selection screen. The list 1101 is a list of firmware sets that match the search condition entered in the search condition setting screen. Regarding the list 1101, the "basic set status" is the release status of the firmware set and the "additional set status" is the release status of the additional set. The additional set status with "-" indicates that an additional set is not available.

Further, a button used for making operation with respect to each firmware set/additional set is also included in the list 1101. The displayed button is changed depending on the release status of the firmware set/additional set. Only the button which is operable with respect to the corresponding firmware set is displayed. A change button 1102 is used for changing information of the corresponding firmware set. A delete button 1103 is used for deleting the corresponding firmware set. An update button 1104 is used for updating (replacing) the corresponding additional set. A back button 1105 is used for returning to the search condition setting screen so that the search condition can be set again.

FIG. 11B illustrates an example of a firmware change screen displayed after the user clicks the change button 1102, which is used for changing a firmware set for a remote updatable model, on the firmware selection screen illustrated in FIG. 11A. By entering a name in a text input area 1111, a name of a firmware set which has already been set can be changed. Further, by entering a version number in a text input area 1112, a version of a firmware set which has already been set can be changed. A radio button 1113 is used for selecting whether to change or not change the version management file. If "change" is selected and a file in a file path selection area 1114 is selected, the version management file can be replaced with another file.

A register button 1115 is used for transmitting the content which is set in the firmware change screen illustrated in FIG. 11B to the firmware transmission server 101 so that the information is changed. A back button 1116 is used for returning to the firmware set select screen illustrated in FIG. 11A so that a firmware set can be selected again. Further, if the change button 1102 that corresponds to a firmware set of a remote non-updatable model is selected, the screen displayed in FIG. 11B will not include the items regarding the version management file.

FIG. 11C illustrates an example of an additional set change screen which is displayed after the user clicks the update button 1104 on the firmware selection screen illustrated in FIG. 11A. A name of a firmware set selected in the firmware selection screen is displayed in a text display area 1121. A version of a firmware set selected in the firmware selection screen is displayed in a text display area 1122. By entering a name in a text input area 1123, a name of an additional set which has already been set can be changed.

A radio button 1124 is used for selecting whether to change or not change the content of the additional set. If "change" is selected and a file in a file path selection area 1125 is selected, the additional set can be replaced with another set. A register button 1126 is used for transmitting the content which is set in the additional set change screen illustrated in FIG. 11C to the firmware transmission server 101 so that the information is changed. A back button 1127 is used for returning to the firmware set select screen illustrated in FIG. 11A and to select a firmware set again.

FIG. 12A to 12C illustrate an example of UI displayed on the display unit 208 of the computer 104 of the sales company when a user downloads a firmware set/additional set registered on the firmware transmission server 101. Regarding the download operation, first the search condition of the firmware set is input, and then the desired firmware set is selected from the narrowed down list of the firmware sets as is with other operations.

FIG. 12A illustrates an example of a firmware search condition setting screen displayed when the user clicks the firmware download 605 on the main menu screen illustrated in FIG. 6. The firmware search condition setting screen in FIG. 12A is an example of a screen which is displayed when a user who does not have the firmware management authority downloads a firmware set. If a user who has the management authority downloads the firmware set, a screen similar to the firmware search condition setting screen in FIG. 10A will be displayed.

In FIG. 12A, a text input area 1201 is where the name of the firmware set is entered. A text input area 1202 is where the version of the firmware set is entered. A cancel button 1203 is used for returning to the main menu screen illustrated in FIG. 6. A search button 1204 is used for transmitting the entered search condition to the firmware transmission server 101 so that the next screen (screen illustrated in FIG. 12B) is displayed.

FIG. 12B illustrates an example of a firmware selection screen which is displayed when the user clicks the search button 1204 on the firmware search condition setting screen illustrated in FIG. 12A. If a user having the management authority downloads the firmware set, the displayed screen will be similar to the firmware selection screen illustrated in FIG. 11A but with a button having a function similar to a select button 1212 described below in place of the change button 1102 and the delete button 1103. A search result list 1211 is a list of firmware sets that match the search condition entered in the firmware search condition setting screen illustrated in FIG. 12A. If the user clicks the select button 1212, a download screen illustrated in FIG. 12C is displayed. If the user clicks a back button 1213, the firmware search condition setting screen illustrated in FIG. 12A is displayed, and the user can designate the search condition again.

FIG. 12C illustrates an example of a download screen used for downloading the firmware set selected in the firmware selection screen illustrated in FIG. 12B. The user selects the file that the user desires to download by checking the check boxes 1221. After then, if the user clicks a download button 1222, the selected file is downloaded.

If an additional set is set to the firmware set selected in the firmware selection screen illustrated in FIG. 12B, a file of an additional set can also be selected by, for example, the check boxes 1221. However, the additional set is not necessarily selected in this manner and a file of an additional set can be selected if a file path selection area and a browse button are provided. Further, if an additional set is set to the firmware set selected in the screen in FIG. 12B and an additional set is not necessarily selected, the additional set can be downloaded at once. Further, if the user clicks a select all button 1223, all of the check boxes will be in a selected state. If the user clicks a cancel all buttons 1224, the check boxes in the selected state will be cleared. If the user clicks a back button 1225, the firmware selection screen illustrated in FIG. 12B is displayed again and the user can reselect the firmware set.

Next, an example of a process flow of the firmware management processing performed by the firmware transmission server 101 will be described. The processing in the flowcharts below is performed by the first CPU 201 or the second CPU 202 of the firmware transmission server 101 executing a computer-executable program stored in the ROM 203, the first HDD 205, or the second HDD 206.

Figure 13:
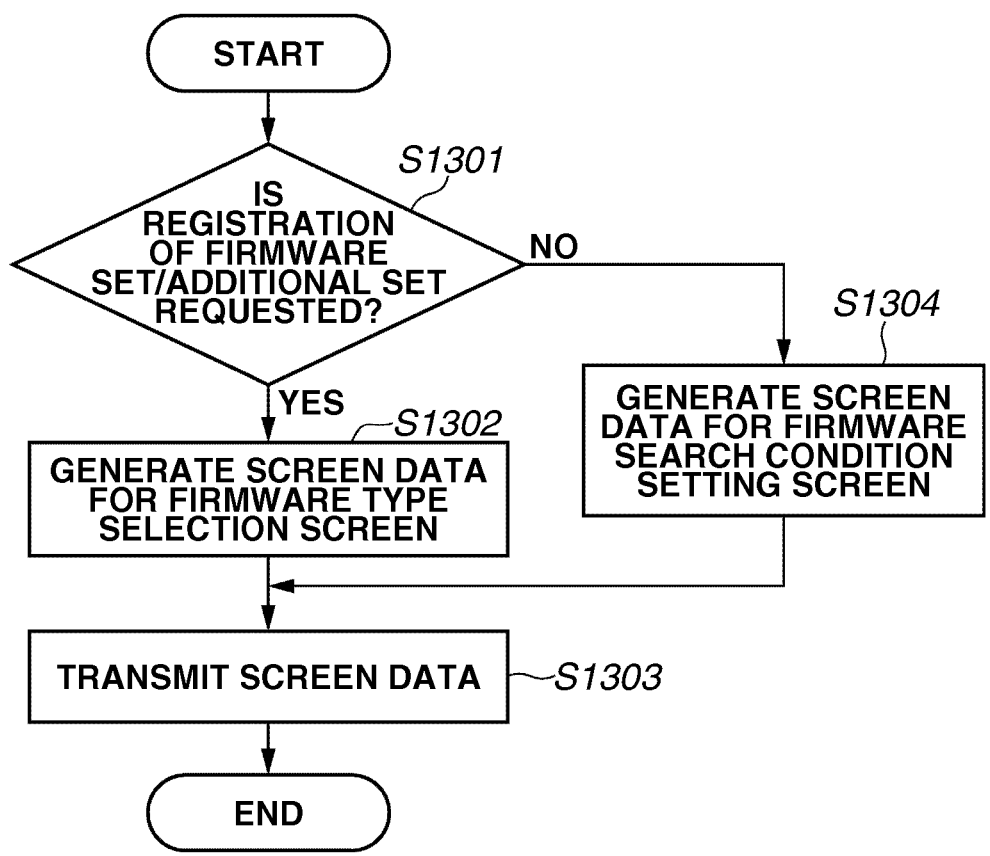
FIG. 13 is a flowchart illustrating processing performed when a firmware management request is received.

FIG. 13 is a flowchart illustrating an example of processing performed when a user clicks a link on the main menu screen illustrated in FIG. 6 and a firmware management request is transmitted to the firmware transmission server 101 via a web browser. In step S1301, the web UI control unit 402 analyzes the received firmware management request and determines whether registration of a firmware set/additional set is requested. If the type of the firmware management (firmware management request) is a request for registration of a firmware set/additional set (YES in step S1301), the processing proceeds to step S1302.

In step S1302, the web UI control unit 402 generates screen data used for selecting a type of the firmware set (i.e., screen data for displaying the firmware type selection screen illustrated in FIG. 7A). In step S1303, the communication control unit 401 transmits the screen data generated in step S1302 to the web browser, and then the processing ends. On the other hand, in step S1301, if the type of the firmware management (firmware management request) is a request other than a request for registration of a firmware set/additional set (NO in step S1301), then the processing proceeds to step S1304.

In step S1304, the web UI control unit 402 generates a firmware search condition setting screen (screen data in FIGS. 10A and 12A) used for setting a search condition of a firmware set according to the firmware management request, and then the processing proceeds to step S1303. In step S1303, the communication control unit 401 transmits the screen data generated in step S1304 to the web browser, and then the processing ends.

Figure 14:
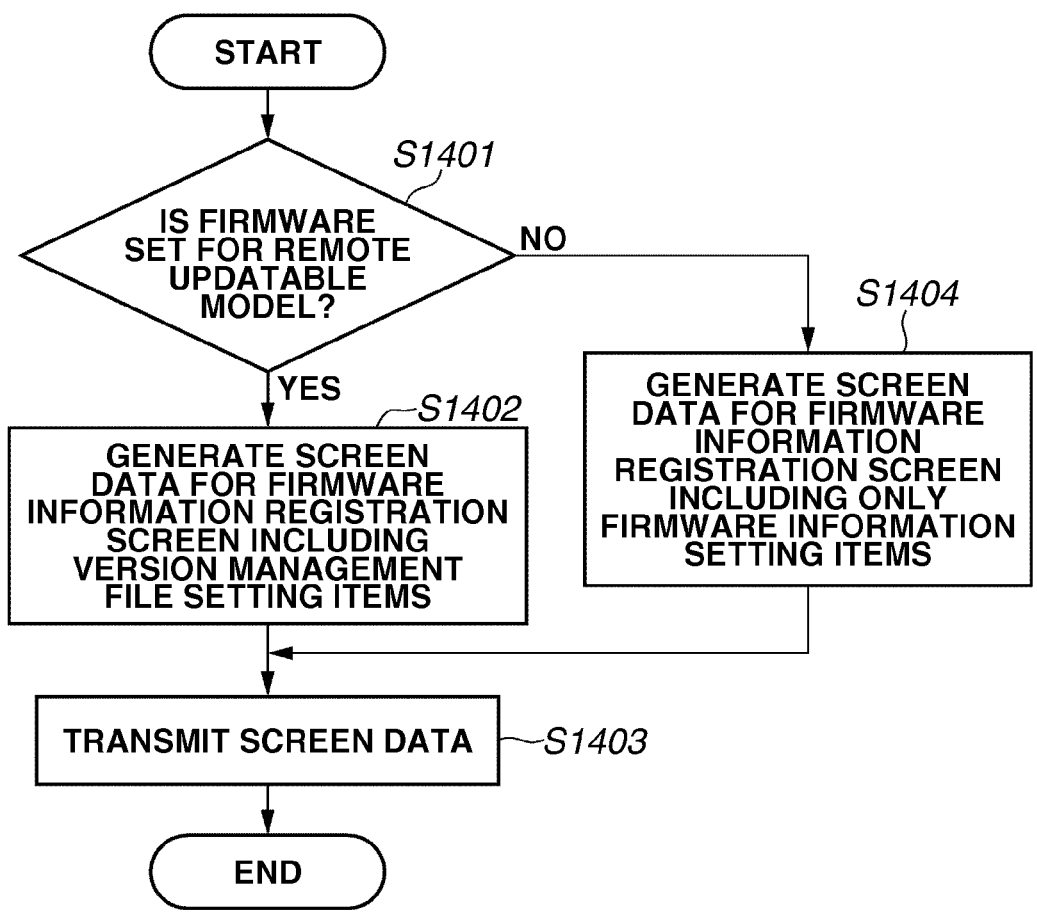
FIG. 14 is a flowchart illustrating processing performed when a next button is clicked on a firmware type selection screen.

FIG. 14 is a flowchart illustrating an example of processing performed when the user clicks the next button 703 on the firmware type selection screen illustrated in FIG. 7A and a request is transmitted to the firmware transmission server 101 via the web browser. In step S1401, the web UI control unit 402 analyzes the received request and determines whether the type of the selected firmware set is a firmware set for a remote updatable model. If the firmware set is for a remote updatable model (YES in step S1401), the processing proceeds to step S1402.

In step S1402, the web UI control unit 402 generates the screen data for the firmware information registration screen (see FIG. 7B) including a setting item of the version management file, and the process proceeds to step S1403. On the other hand, in step S1401, if the firmware set is for a remote non-updatable model (NO in step S1401), then the processing proceeds to step S1404. In step S1404, the web UI control unit 402 generates screen data for the firmware information registration screen (see FIG. 8A) by which a version management file cannot be set. In step S1403, the communication control unit 401 transmits the screen data generated in step S1402 or step S1404 to the web browser, and then the processing ends.

Figure 15:
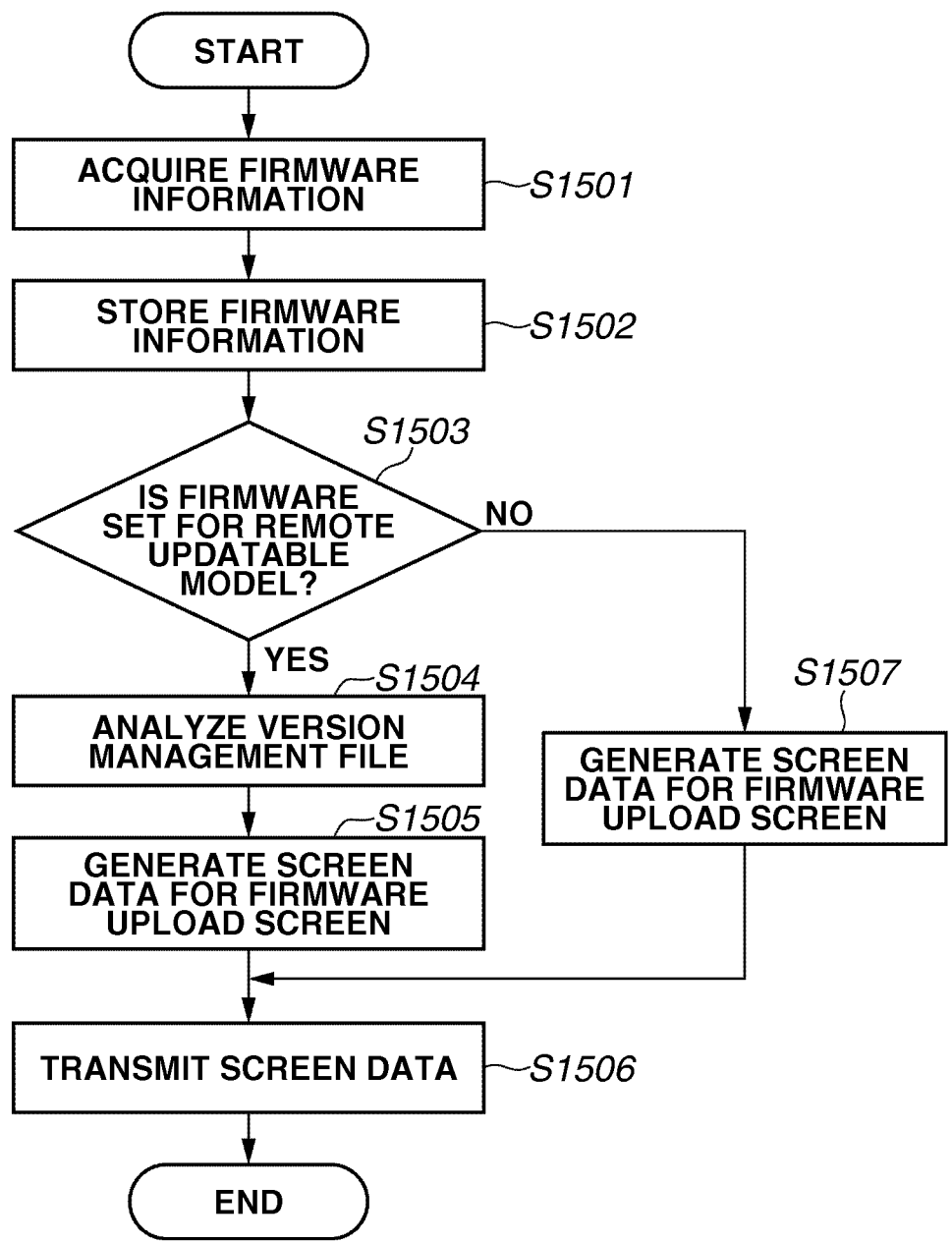
FIG. 15 is a flowchart illustrating processing performed when a register button is clicked on a firmware information registration screen.

FIG. 15 is a flowchart illustrating an example of processing performed when the user clicks the register button 715 or 733 on the firmware information registration screen (see FIGS. 7B and 8A) and a request is transmitted to the firmware transmission server 101 via the web browser. In step S1501, the firmware information input/output control unit 403 acquires firmware information/additional information included in the received request.

In step S1502, the firmware information input/output control unit 403 adds the acquired firmware information/additional information to a database (DB). In step S1503, the firmware management control unit 405 analyzes a type of the firmware set based on information (e.g., presence/absence of a version management file) included in the received request and determines whether the firmware set is for a remote updatable model. If the firmware set is for a remote updatable model (YES in step S1503), then the processing proceeds to step S1504.

In step S1504, the firmware management control unit 405 analyzes the version management file included in the received request. In step S1505, the web UI control unit 402 generates screen data of the firmware upload screen (see FIG. 7C) used for uploading firmware included in the version management file. In step S1506, the communication control unit 401 transmits the screen data generated in step S1505 to the web browser, and then the processing ends. On the other hand, in step S1503, if the firmware set is a firmware set not for a remote updatable model (i.e., for remote non-updatable model) (NO in step S1503), then the processing proceeds to step S1507.

In step S1507, the web UI control unit 402 generates screen data of a firmware upload screen (see FIG. 8B) by which only one firmware file can be uploaded. In step S1506, the communication control unit 401 transmits the screen data generated in step S1507 to the web browser, and then the processing ends.

If registration of an additional set is requested, in addition to or in place of the processing performed in steps S1505 and S1507, the web UI control unit 402 generates screen data for displaying, on the display, a text input area used for entering a name of the additional set, a file path selection area used for setting a path to the file of the additional set as well as a browse button used for operating the file path selection area, according to the request included in the additional information. If only the registration of an additional set is requested, this processing can be performed without the determination in step S1503.

Figure 16:
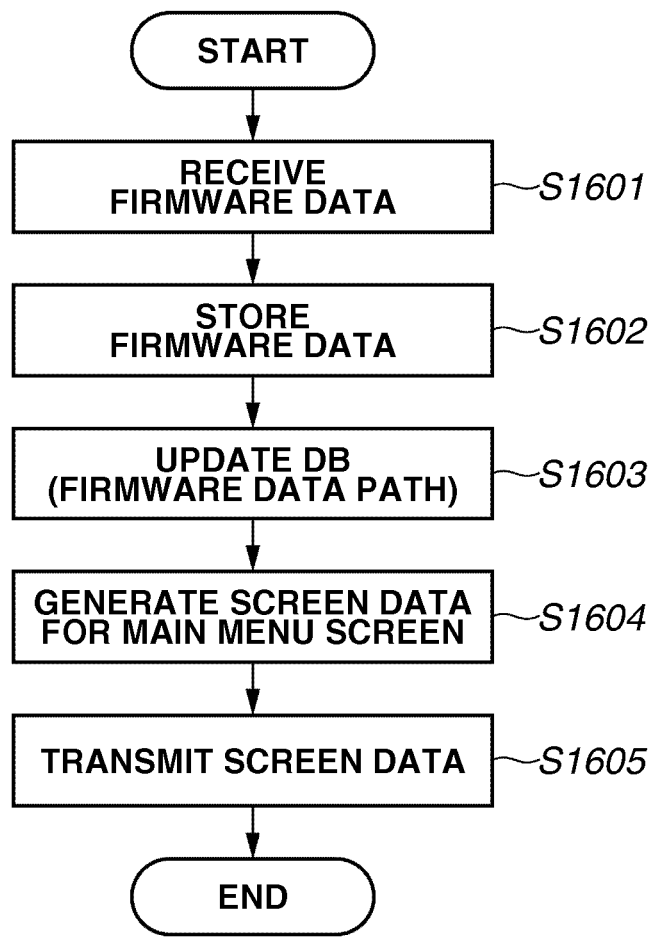
FIG. 16 is a flowchart illustrating processing performed when an upload button is clicked on a firmware upload screen.

FIG. 16 is a flowchart illustrating an example of processing performed when the user clicks the upload button 725 or 742 on the firmware upload screen (see FIGS. 7C and 8B) and a request is transmitted to the firmware transmission server 101 via the web browser. In step S1601, the communication control unit 401 receives firmware data/additional data.

In step S1602, the firmware data input/output control unit 404 adds the firmware data/additional data received in step S1601 to the DB. In step S1603, according to the firmware data/additional data stored in step S1602, the firmware management control unit 405 updates firmware information (firmware data path) or additional information (additional set data path) in the DB. Accordingly, the firmware data/additional data and the firmware information/additional information are added to the DB (storage medium) in association with each other.

In step S1604, the web UI control unit 402 generates screen data of the main menu screen illustrated in FIG. 6. In step S1605, the communication control unit 401 transmits the screen data generated in step S1604 to the web browser, and then the processing ends.

Figure 17:
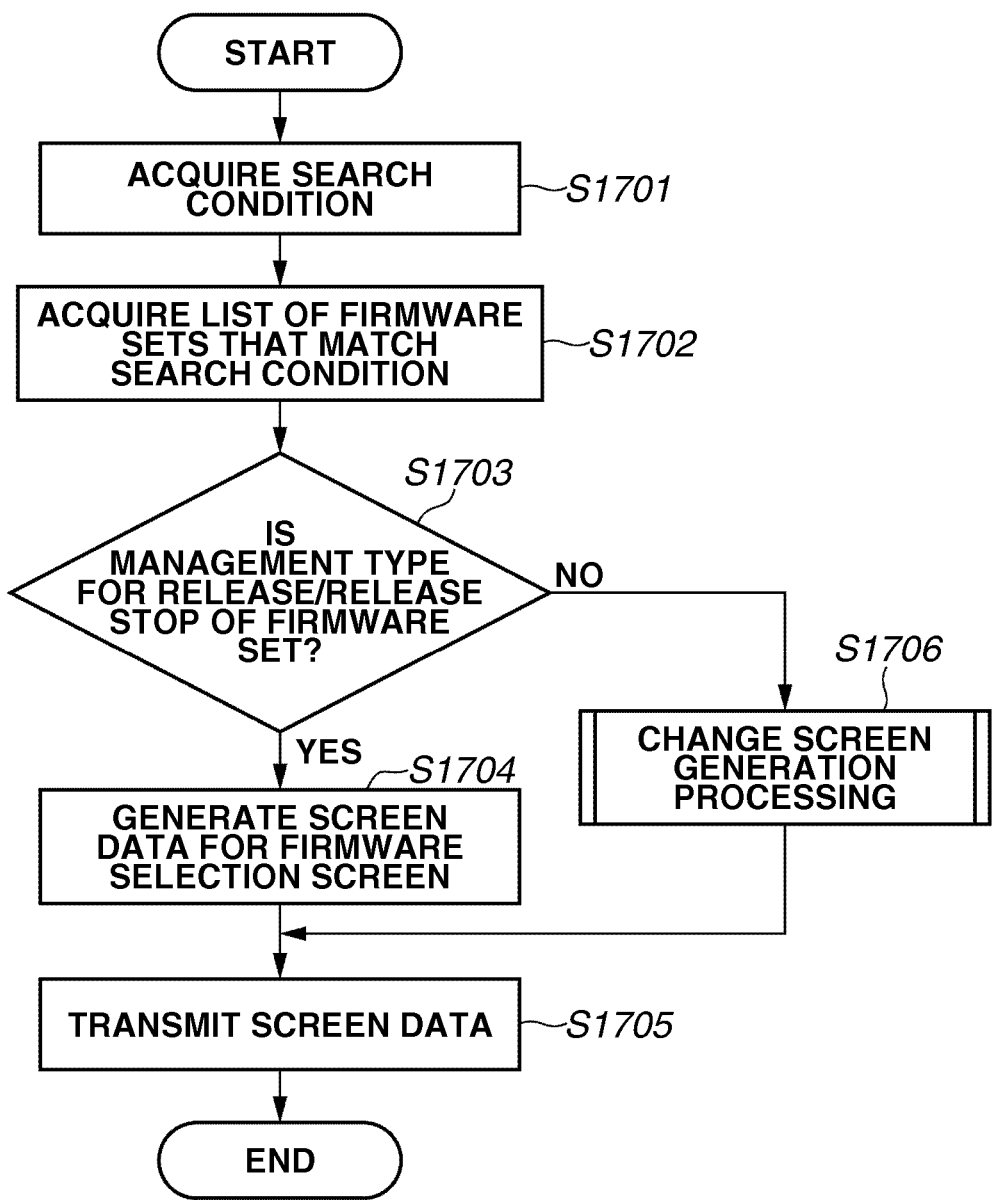
FIG. 17 is a flowchart illustrating processing performed when a search button is clicked on a search condition registration screen.

FIG. 17 is a flowchart illustrating an example of processing performed when the user clicks the search button 1005 or 1204 on the search condition registration screen (see FIGS. 10A and 12A) and a request is transmitted to the firmware transmission server 101 via the web browser. In step S1701, the firmware management control unit 405 acquires a search condition from the received request.

In step S1702, the firmware information input/output control unit 403 acquires a list of firmware sets that match the search condition acquired in step S1701 from the DB. In step S1703, the firmware management control unit 405 analyzes the request and determines whether the management type is a release/release stop of the firmware set. If the management type is a release/release stop of the firmware set (YES in step S1703), then the processing proceeds to step S1704.

In step S1704, the web UI control unit 402 generates screen data for the firmware selection screen (see FIG. 10B) used for selecting a firmware set that matches the search condition, and then the processing proceeds to step S1705. On the other hand, in step S1703, if the management type is not a release/release stop of the firmware set, and is a change/delete of the firmware set or update of an additional set (NO in step S1703), then the processing proceeds to step S1706. In step S1706, the change screen generation processing is performed. According to this processing, screen data for the firmware selection screen (see FIG. 11A) used for changing/deleting a firmware set or updating an additional set is generated.

Details of the change screen generation processing performed in step S1706 will be described below referring to FIG. 20. When the change screen generation processing is completed, the processing proceeds to step S1705. In step S1705, the communication control unit 401 transmits the screen data generated in step S1704 or S1706 to the web browser, and then the processing ends.

Figure 18:
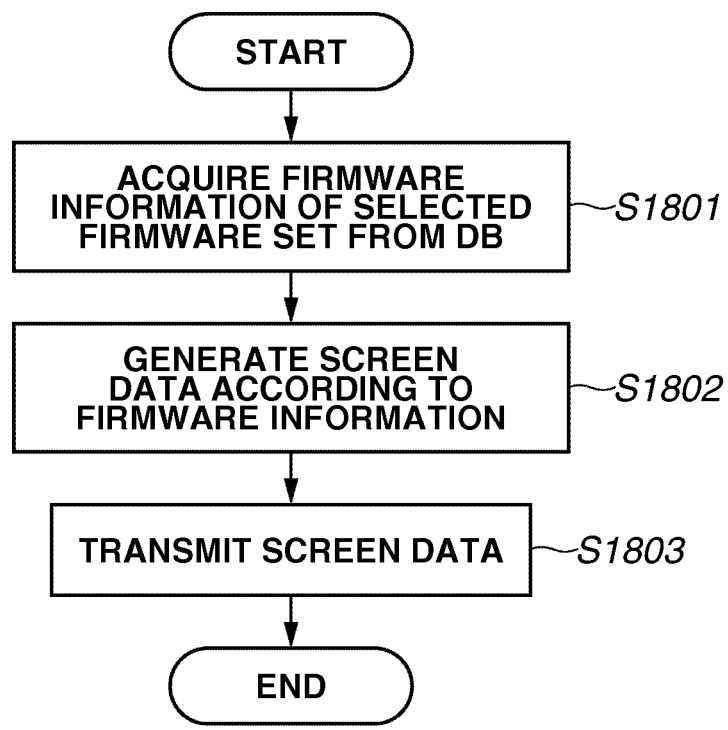
FIG. 18 is a flowchart illustrating processing performed when a select button is clicked on a firmware selection screen.

FIG. 18 is a flowchart illustrating an example of processing performed when the user clicks the selection button 1012 on the firmware selection screen illustrated in FIG. 10B and a request is transmitted to the firmware transmission server 101 via the web browser. In step S1801, the firmware information input/output control unit 403 acquires firmware information of the firmware set selected in the firmware selection screen (FIG. 10B) from the DB. If an additional set is set to the firmware set, the firmware information input/output control unit 403 also acquires additional information of the additional set corresponding to the firmware set from the DB.

In step S1802, the web UI control unit 402 generates screen data for the release setting screen (see FIG. 10C) used for setting the release date by using the firmware information/ additional information acquired in step S1801. In step S1803, the communication control unit 401 transmits the screen data generated in step S1802 to the web browser, and then the processing ends.

Figure 19:
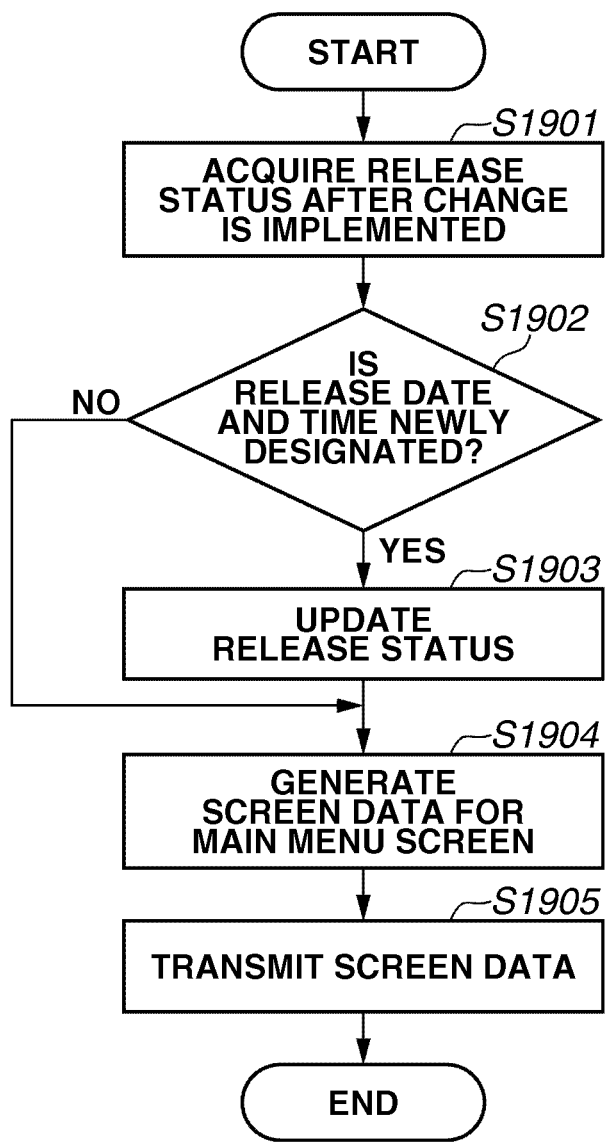
FIG. 19 is a flowchart illustrating an example of processing performed when a release button is clicked on a release setting screen.

FIG. 19 is a flowchart illustrating an example of processing performed when the user clicks the release button 1023 on the release setting screen illustrated in FIG. 10C and a request is transmitted to the firmware transmission server 101 via the web browser. In step S1901, the firmware management control unit 405 acquires a release status after the change from the received request. In step S1902, the web UI control unit 402 determines whether the radio button 1021 or 1025 is selected and the release date is newly designated. If the release date is determined as newly designated (YES in step S1902), the processing proceeds to step S1903.

In step S1903, the firmware information input/output control unit 403 updates a release status in the DB corresponding to the radio button 1021 or 1025. In step S1904, the web UI control unit 402 generates the screen data for the main menu screen (see FIG. 6). In step S1905, the communication control unit 401 transmits the screen data generated in step S1904 to the web browser, and then the processing ends. On the other hand, in step S1902, if the release date is determined as not newly designated (NO in step S1902), then the processing proceeds to step S1904.

According to the present embodiment, an example of an acquisition unit is realized by the processing in step S1501, S1601, or S1901. Further, the release status is an example of setting concerning release of a program set, the firmware data is an example of program data, the version management file (each piece of firmware information) is an example of information used in identifying a program. Further, an example of a storage unit is realized by the processing performed in steps S1502, S1602, S1603, or S1903.

Figure 20:
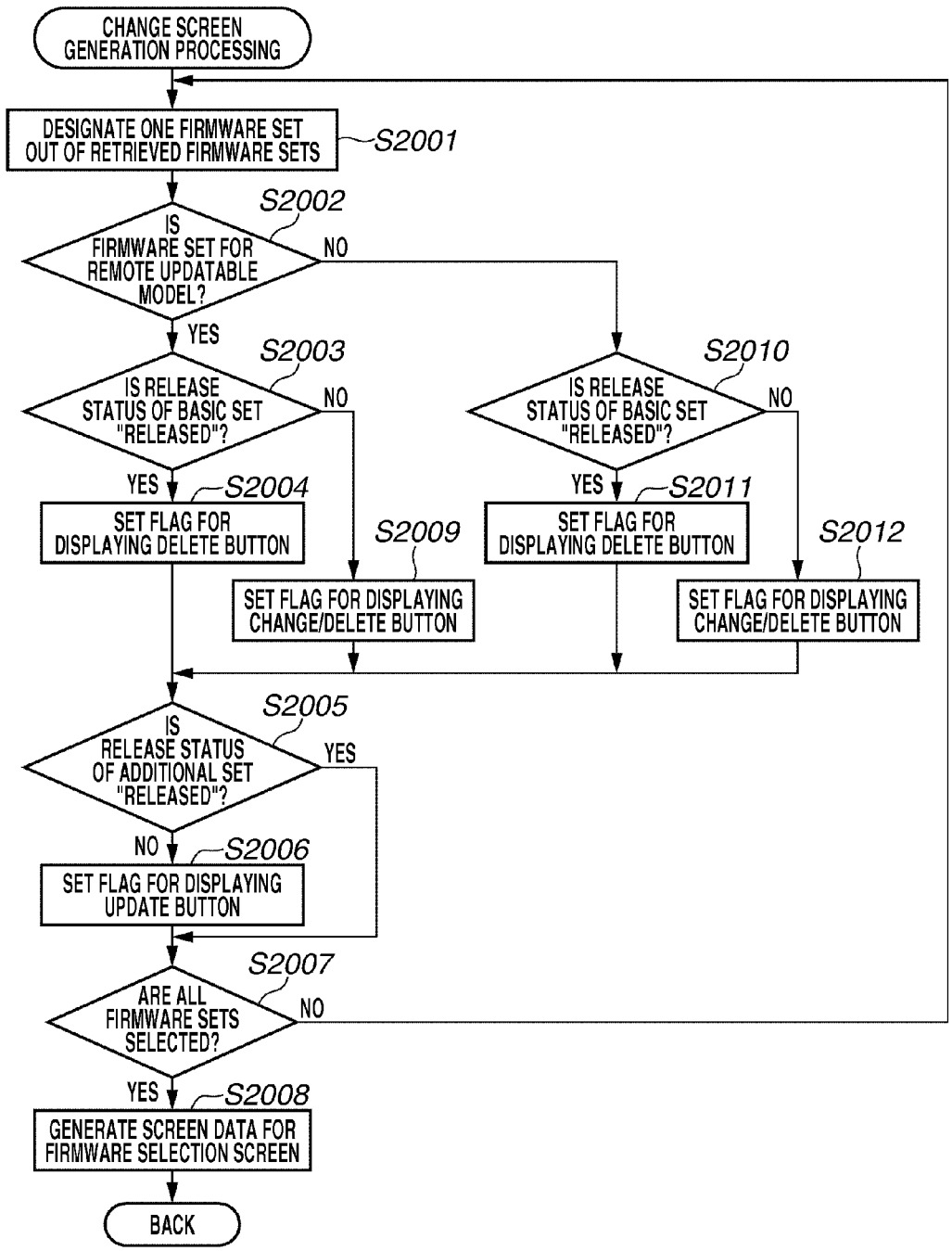
FIG. 20 is a flowchart illustrating detailed processing performed in step S1706.

FIG. 20 is a flowchart illustrating an example of the change screen generation processing performed in step S1706 in FIG. 17. In step S2001, the firmware management control unit 405 designates one firmware set that is not yet selected from the firmware sets acquired in step S1702 in FIG. 17. In step S2002, the firmware management control unit 405 determines whether the firmware set designated in step S2001 is a firmware set for a remote updatable model. If the firmware set type is a firmware set for a remote updatable model (YES in step S2002), the processing proceeds to step S2003.

In step S2003, the firmware management control unit 405 determines a release status of the firmware set (basic set) designated in step S2001 and further determines whether the release status is the "already released" status. If the status is determined as the "already released" status (YES in step S2003), then the processing proceeds to step S2004. In step S2004, the firmware management control unit 405 sets a flag indicating that the delete button 1103 is to be displayed for the firmware set designated in step S2001 on the firmware selection screen (FIG. 11A).

In step S2005, the firmware management control unit 405 determines whether the additional set corresponding to the firmware set designated in step S2001 is in the "already released" status. As a result of the determination, if the state of the additional set is determined to be "already released" (YES in step S2005), the processing proceeds to step S2007. Further, if an additional set is not included, step S2006 is also omitted, and the processing proceeds to step S2007. On the other hand, if the release status is determined as other than the "already released" status (NO in step S2005), the processing proceeds to step S2006. In step S2006, a flag is set. The flag indicates that the update button 1104 is to be displayed for the firmware set designated in step S2001.

In step S2007, the firmware management control unit 405 determines whether all the firmware sets searched in step S1702 in FIG. 17 are selected. If all the firmware sets searched in step S1702 in FIG. 17 are not yet selected (NO in step S2007), then the processing returns to step S2001. On the other hand, if all the firmware sets searched in step S1702 in FIG. 17 are selected (YES in step S2007), the processing proceeds to step S2008. In step S2008, the web UI control unit 402 generates the screen data for the firmware selection screen (see FIG. 11A) according to the flag, and then the processing ends.

In step S2003, if the release status is determined as a status other than the released status (NO in step S2003), then the processing proceeds to step S2009. In step 2009, the firmware management control unit 405 sets a flag. The flag indicates that the change button 1102 and the delete button 1103 are to be displayed for the firmware set designated in step S2001. Then, the processing proceeds to the above-described step S2005. Further, in step S2002, if the firmware set type is a firmware set for a remote non-updatable model (NO in step S2002), then the processing proceeds to step S2010.

In step S2010, the firmware management control unit 405 determines the release status of the firmware set (basic set) designated in step S2001 and further determines whether the release status is the "already released" status. If the status is determined as the "already released" status (YES in step S2010), then the processing proceeds to step S2011. In step S2011, the firmware management control unit 405 sets a flag indicating that the delete button 1103 is to be displayed for the firmware set designated in step S2001. Then, the processing proceeds to the above-described step S2005. On the other hand, in step S2010, if the status is determined as a status other then the "already released" status (NO in step S2010), then the processing proceeds to step S2012.

In step 2012, the firmware management control unit 405 sets a flag indicating that the change button 1102 and the delete button 1103 are to be displayed for the firmware set designated in step S2001. Then the processing proceeds to the above-described step S2005. The screen displayed when the change button is clicked on the screen depends on the type of the firmware set. In other words, as described above, if the change button 1102 that corresponds to a firmware set of a remote non-updatable model is selected, then the item of the version management file is not displayed in the firmware change screen in FIG. 11B. Thus, different flags are set for steps S2009 and S2012.

According to the present embodiment, an example of a determination unit is realized by the processing performed in step S2002. Further, an example of a decision unit is realized according to the processing performed in step S2003 or S2010, and an example of a second decision unit is realized by the processing performed in step S2005. Further, an example of a provision unit is realized by providing the firmware selection screen (see FIG. 11A) displayed according to the flag set in step S2004 or S2011 to a computer of the sales company. Further, a second provision unit is realized by providing the firmware selection screen (see FIG. 11A) displayed according to the flag set in step S2006 to a computer of the sales company. Furthermore, an example of a screen used for editing a program set is realized according to the firmware selection screen (see FIG. 11A).

Figure 21:
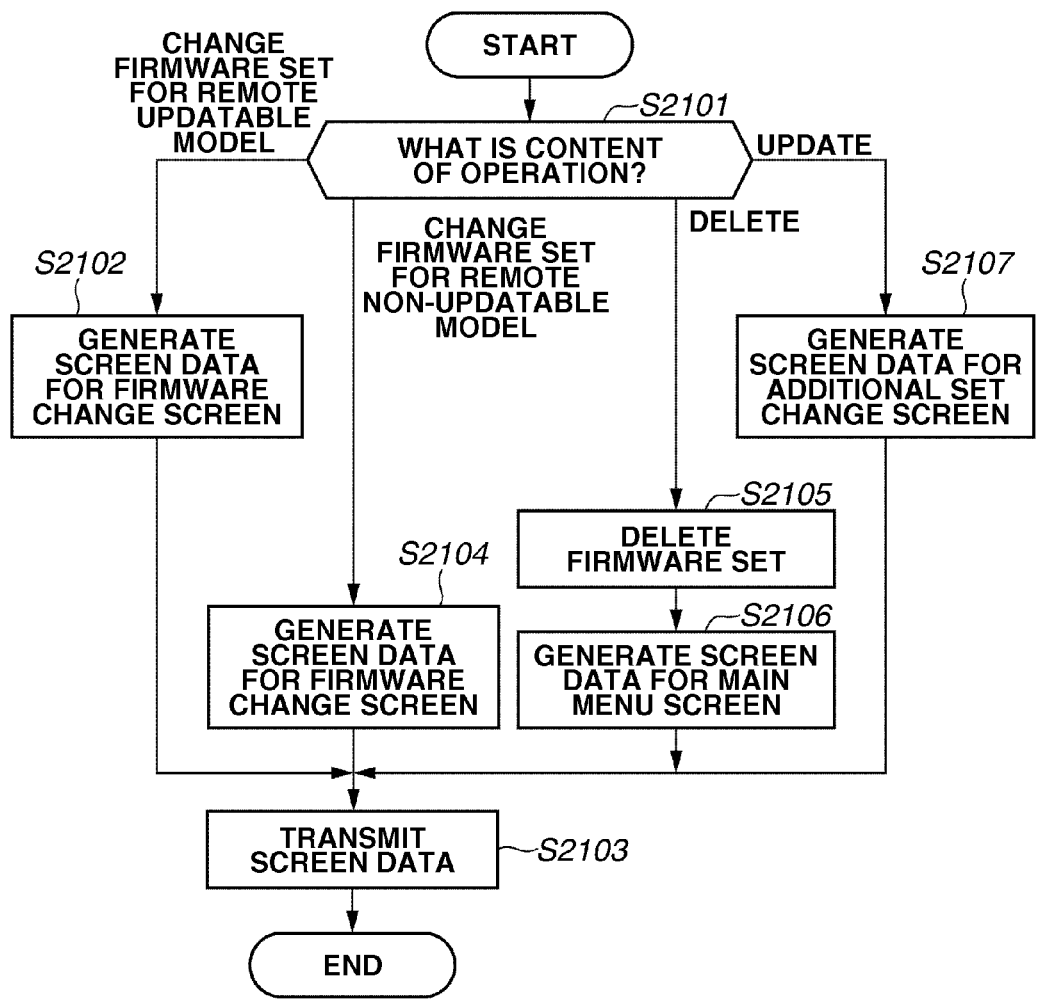
FIG. 21 is a flowchart illustrating processing performed when a change button, a delete button, or an update button is clicked on a firmware change screen or an additional set change screen.

FIG. 21 is a flowchart illustrating an example of processing performed when the user clicks the change button 1102, the delete button 1103, or the update button 1104 on the firmware selection screen illustrated in FIG. 11A, and a request is received via the web browser. When the request is received via the web browser, in step S2101, the web UI control unit 402 determines a type of the button that has been clicked. If the change button 1102 of the firmware set for a remote updatable model is determined to have been clicked, the processing proceeds to step S2102.

In step S2102, the web UI control unit 402 generates screen data for the firmware change screen (see FIG. 11B) by which a version management file can be changed. In step S2103, the communication control unit 401 transmits the generated screen data to the web browser, and then the processing ends. In step S2101, if the user clicks a change button of a firmware set for a remote non-updatable model, the processing proceeds to step S2104.

In step S2104, the web UI control unit 402 generates screen data for the firmware change screen not including an item of a version management file. Then, the processing proceeds to the above-described step S2103. In step S2101, if the user clicks the delete button 1103, the processing proceeds to step S2105. In step S2105, the firmware information input/output control unit 403 and the firmware data input/output control unit 404 delete the firmware data of the firmware set and additional data and additional information of the firmware information/additional set corresponding to the delete button 1103 that has been clicked from the DB.

In step S2106, the web UI control unit 402 generates the screen data for the main menu screen (see FIG. 6). Then, the processing proceeds to step S2103. In step S2101, if the update button 1104 is clicked, the processing proceeds to step S2107. In step S2107, the web UI control unit 402 generates screen data for the additional set change screen (see FIG. 11C) by which the additional set can be replaced. Then, the processing proceeds to the above-described step S2103.

As described above, according to the present embodiment, editing (changing) of content (version) of firmware included in a firmware set is permitted or not permitted according to the release status of the firmware set. In other words, according to the present embodiment, if the firmware set is in the "already released" state, the combination of the versions of the firmware included in the firmware set cannot be changed. However, if the firmware set is not in the "already released" state, the combination of the versions is permitted.

Thus, with respect to a firmware set whose change is permitted, the change button 1102 is displayed on the firmware selection screen (see FIG. 11A) where the firmware set to be changed/deleted is selected. On the other hand, with respect to a firmware set whose change is not permitted, the change button 1102 is not displayed on the firmware selection screen where the firmware set to be changed/deleted is selected. According to this display/non-display of the change button 1102, changing of the version management file of the firmware set will no longer be necessary. This will prevent firmware sets having the same version number but with different contents from being released onto the market, and thus helps avoid confusion in the market. Further, the present embodiment is also effective in maintaining the level of maintenance.

Furthermore, according to the present embodiment, the update button 1104 is displayed on the firmware selection screen (see FIG. 11A) for the additional set, as well as for the firmware set, in the released state. This will help prevent different additional sets for the same firmware set from being on the market.

Further, according to the present embodiment, two attributes are provided for the firmware types (firmware set types). One is for the firmware sets which can be remotely transmitted and the other is for the firmware sets which cannot be remotely transmitted. Processing is determined according to these attributes. Thus, both the firmware adaptable to the transmission system and the conventional firmware not adaptable to the transmission system can be managed on the same system.

According to the present embodiment, the release status is any one of the "registered", "to be released", "already released", and "release stopped". However, the release status is not limited to such examples and may be any status so long as it indicates setting regarding release of firmware. For example, the release level information (e.g., released to the market (released to the end user) or released to the sales company (released only to the sales company)) can be included in the release status.

In such a case, for example, it becomes possible to set the firmware set released to the market so that it is not changeable and the firmware set released to the sales company so that it is changeable. Further, the expected release date and time can be included in the release status. In such a case, for example, the firmware set can be set as changeable regarding the firmware set whose time from the present time to the expected release time is longer than a predetermined time, and not changeable for other firmware sets.

Further, according to the present embodiment, the change button 1102 is not displayed on the firmware selection screen (see FIG. 11A) used for selecting the firmware set to be changed/deleted for the firmware set whose change is not permitted. However, this is not always necessary. For example, it is possible to display the change button 1102 but set it so that it cannot be operated (e.g., gray out the change button 1102). Further, a change button of a firmware set whose change is permitted and a change button of a firmware set whose change is not permitted can be set so that they are displayed in the same manner.

In such a case, if a change button of a firmware set whose change is not permitted is selected, processing for changing the firmware set is not performed but a pop-up display indicating that the firmware set cannot be changed is displayed. Further, the change button may be displayed but set so that it is gray out. Accordingly, the content of the program set cannot be changed.

Further, although a firmware set being a set of firmware is transmitted according to the present embodiment, a program set being a set of programs other than firmware may also be transmitted.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-165902 filed Jul. 14, 2009, which is hereby incorporated by reference herein in its entirety.

What is claimed is:

1. A system comprising a transmission apparatus configured to control transmission of a program set including a plurality of programs according to a request from an image forming apparatus on a network and an information processing apparatus,
   wherein the information processing apparatus includes:
   a display device;
   a setting unit configured to perform setting of release of the program set; and a display unit configured to display a screen used for editing the program set on the display device,
   wherein the transmission apparatus includes:
   a determination unit configured to determine whether the program set can be remotely updated when the program set is installed in the image forming apparatus, according to an attribute regarding remote update of the program set;
   a decision unit configured to decide, according to the setting regarding release of the program is set, whether to permit a change regarding the program set, wherein the decision unit decides that as for a program whose release is set, a change regarding the program set is not to be permitted in the transmission apparatus, and as for a program set whose release is not set, a change regarding the program set is to be permitted in the transmission apparatus,
   a provision unit configured to provide, if the change regarding the program set is not to be permitted, a screen where the change regarding the program set is disabled to the information processing apparatus as a screen displayed by the display unit,
   wherein the provision unit provides, i) in a case where the change regarding the program set is to be permitted in the transmission apparatus and
   the program set can be remotely updated when the program set is installed in the image forming apparatus, a screen where a change of a name, a version and a version management file of the program set is enabled, and ii) in a case where the change regarding the program set is to be permitted in the transmission apparatus and the program set cannot be remotely updated when the program set is installed in the image forming apparatus, a screen where the change of a name and a version of the program set is enabled but the change of the version management file of the program set is disabled.

2. A transmission apparatus configured to control transmission of a program set including a plurality of programs according to a request from an image forming apparatus on a network, the transmission apparatus comprising at least a processor, functioning as:
   a determination unit configured to determine whether the program set can be remotely updated when the program set is installed in the image forming apparatus, according to an attribute regarding remote update of the program set;
   a decision unit configured to decide, according to setting regarding release of the program set, whether to permit a change regarding the program set, wherein the decision unit decides that as for a program whose release is set, a change regarding the program set is not to be permitted in the transmission apparatus, and as for a program whose release is not set, a change regarding the program set is to be permitted in the transmission apparatus;
   and a provision unit configured to provide to an information processing apparatus, as a screen used for editing the program set to be provided to the image forming apparatus, if a change regarding the program set is decided as not to be permitted, a screen by which the program set cannot be changed,
   wherein the provision unit provides, i) in a case where the change regarding the program set is to be permitted in the transmission apparatus and the program set can be remotely updated when the program set is installed in the image forming apparatus, a screen where a change of a name, a version and a version management file of the program set is enabled, and ii) in a case where the change regarding the program set is to be permitted in the transmission apparatus and the program set cannot be remotely updated when the program set is installed in the image forming apparatus, a screen where the change of a name and a version of the program set is enabled but the change of the version management file of the program set is disabled.

3. The transmission apparatus according to claim 2, wherein if the change regarding the program set is not to be permitted, the provision unit provides to the information processing apparatus a screen not including an operation unit used for instructing a change of content of the program set as a screen for editing the program set, and if the change regarding the program set is to be permitted, the provision unit provides to the information processing apparatus a screen including an operation unit used for instructing a change of content of the program set as a screen for editing the program set.

4. The transmission apparatus according to claim 2, further comprising:
   an acquisition unit configured to acquire, from the information processing apparatus, setting regarding release of the program set, a program included in the program set, and identification information used for identifying the program; and a storage unit configured to store, in a storage medium, the setting regarding release of the program set, the program included in the program set, and the acquired identification information, in association with each other.

5. The transmission apparatus according to claim 2, wherein the version management file contains information regarding the version of the program set and each name, type and version for the plurality of programs included in the program set.

6. A method for a system including a transmission apparatus configured to control transmission of a program set including a plurality of programs according to a request from an image forming apparatus on a network and an information processing apparatus including a display device, the method comprising:
   performing setting of release of the program set;
   displaying a screen used for editing the program set on the display device;
   determining whether the program set can be remotely updated when the program set is installed in the image forming apparatus according to an attribute of the program set;

deciding according to setting regarding release of the program is set, whether to permit a change regarding the program set, wherein the deciding decides that as for a program whose release is set, a change regarding the program set is not to be permitted in the transmission apparatus, and as for a program set whose release is not set, a change regarding the program set is to be permitted in the transmission apparatus; providing, if the change regarding the program set is not to be permitted, a screen where the change regarding the program set is disabled to the information processing apparatus as a screen displayed on the display device, wherein the providing provides, i) in a case where the change regarding the program set is to be permitted in the transmission apparatus and the program set can be remotely updated when the program set is installed in the image forming apparatus, a screen where a change of a name, a version and a version management file of the program set is enabled, and ii) in a case where the change regarding the program set is to be permitted in the transmission apparatus and the program set cannot be remotely updated when the program set is installed in the image forming apparatus, a screen where the change of a name and a version of the program set is enabled but the change of the version management file of the program set is disabled.

7. A method for a transmission apparatus used for controlling transmission of a program set including a plurality of programs according to a request from an image forming apparatus on a network, the method comprising:

determining whether the program set can be remotely updated when the program set is installed in the image forming apparatus, according to an attribute regarding remote update of the program set;

deciding, according to setting regarding release of a program set, whether to permit a change regarding the program set, wherein the deciding decides that as for a program whose release is set, a change regarding the program set is not to be permitted in the transmission apparatus, and as for a program whose release is not set, a change regarding the program set is to be permitted in the transmission apparatus; and providing to an information processing apparatus, as a screen used for editing a program set to be provided to the image forming apparatus, a screen by which a change regarding the program set whose change has been decided as not to be given permission, wherein the providing provides, i) in a case where the change regarding the program set is to be permitted in the transmission apparatus and the program set can be remotely updated when the program set is installed in the image forming apparatus, a screen where a change of a name, a version and a version management file of the program set is enabled, and ii) in a case where the change regarding the program set is to be permitted in the transmission apparatus and the program set cannot be remotely updated when the program set is installed in the image forming apparatus, a screen where the change of a name and a version of the program set is enabled but the change of the version management file of the program set is disabled.

8. The method according to claim 7, further comprising, if the change regarding the program set is not to be permitted, providing to the information processing apparatus a screen not including an operation unit used for instructing a change of content of the program set as a screen for editing the program set, and if the program set is to be permitted, providing to the information processing apparatus a screen including an operation unit used for instructing a change of content of the program set as a screen for editing the program set.

9. The method according to claim 7, further comprising:

acquiring, from the information processing apparatus, setting regarding release of the program set, a program included in the program set, and identification information used for identifying the program; and storing, in a storage medium, the setting regarding release of the program set, the program included in the program set, and the acquired identification information, in association with each other.

10. The method according to claim 7, wherein the version management file contains information regarding the version of the program set and each name, type and version for the plurality of programs included in the program set.

11. A non-transitory computer-readable storage medium storing a computer program for causing a computer to execute a method for controlling transmission of a program set including a plurality of programs according to a request from an image forming apparatus on a network, the method comprising:

determining whether the program set can be remotely updated when the program set is installed in the image forming apparatus, according to an attribute regarding remote update of the program set;

deciding, according to setting regarding release of a program set, whether to permit a change regarding the program set, wherein the deciding decides that as for a program whose release is set, a change regarding the program set is not to be permitted in the transmission apparatus, and as for a program whose release is not set, a change regarding the program set is to be permitted in the transmission apparatus; and providing to an information processing apparatus, as a screen used for editing a program set to be provided to the image forming apparatus, a screen by which a change regarding a program set whose change has been decided as not to be given permission, wherein the providing provides, i) in a case where the change regarding the program set is to be permitted in the transmission apparatus and the program set can be remotely updated when the program set is installed in the image forming apparatus, a screen where a change of a name, a version and a version management file of the program set is enabled, and ii) in a case where the change regarding the program set is to be permitted in the transmission apparatus and the program set cannot be remotely updated when the program set is installed in the image forming apparatus, a screen where the change of a name and a version of the program set is enabled but the change of the version management file of the program set is disabled.

12. The non-transitory computer-readable storage medium according to claim 11, further comprising, if the change regarding the program set is not to be permitted, providing to the information processing apparatus a screen not including an operation unit used for instructing a change of content of the program set as a screen for editing the program set, and if the program set is to be permitted, providing to the information processing apparatus a screen including an operation unit used for instructing a change of content of the program set as a screen for editing the program set.

13. The non-transitory computer-readable storage medium according to claim 11, further comprising:

acquiring, from the information processing apparatus, setting regarding release of the program set, a program included in the program set, and identification information used for identifying the program; and storing, in a storage medium, the setting regarding release of the program set, the program included in the program set, and the acquired identification information, in association with each other.

14. The computer-readable storage medium according to claim 11, wherein the version management file contains information regarding the version of the program set and each name, type and version for the plurality of programs included in the program set.

* * * * *